United States Patent Office 3,067,689
Patented Dec. 11, 1962

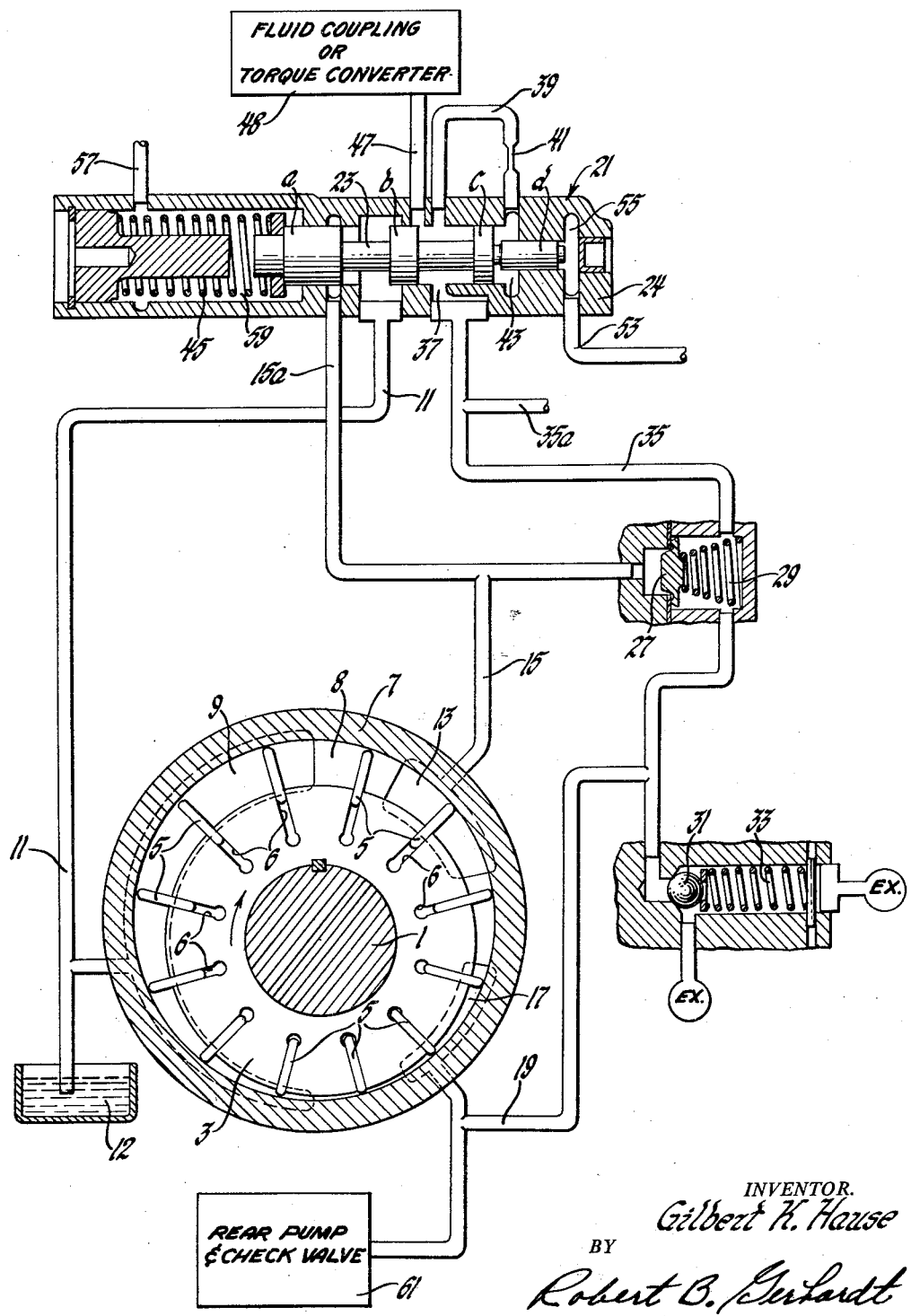

3,067,689
VARIABLE CAPACITY FLUID SUPPLY
Gilbert K. Hause, Franklin, Mich., assignor to General Motors Corporation, Detroit, Mich., a corporation of Delaware
Filed Oct. 6, 1958, Ser. No. 765,542
1 Claim. (Cl. 103—42)

This invention relates to fluid pressure supply systems and more particularly to variable capacity fluid pumps with associated automatic controls and still more particularly to variable capacity pumps suitable for use in automatic transmissions.

Where positive displacement pumps are used in a fluid system having varying requirements and where the pumps themselves are operated at various speeds, it is desirable to relate the pump fluid displacement per revolution in accordance with the actual demand. A variable capacity provides for minimum power consumption by the pump and is especially advantageous in an automatic transmission where a pump must have a large capacity to provide sufficient volume and pressure even when the pump is operating at a relatively low speed. Thus, an engine or input shaft connected pump for a fluid operated motor vehicle transmission has itself a wide speed range and has a wide fluid volume demand to satisfy.

Various types of variable displacement pumps have been proposed and used commercially and these provide the above desired results. However, pumps now in use are relatively complex, expensive to manufacture and subject to maintenance problems due to the fact that the pumps are controlled by internally moving parts in the pump.

It is therefore an object of the invention to provide a positive displacement pump and a control therefor that has its displacement automatically varied so that its power consumption is a minimum.

It is a further object to provide a rotary pump for a fluid transmission having a plurality of discharge ports, at least one of which can be automatically controlled to vary the volume displacement of the pump.

These and other objects and advantages will be readily apparent from the following specification and drawing of one embodiment of the invention and in which the FIGURE is a schematic illustration of the pump and control as it might be used in an automatic transmission. Since the pump and control could be utilized in many different transmission installations as well as other systems and since such use would be apparent to those skilled in the art the details of the transmission are not shown or described.

The pump is operated by a shaft 1, which in a transmission installation could be connected to be rotated by the transmission input shaft. A rotor 3 is keyed to rotate with the shaft 1 and has a plurality of vanes 5 radially slidable in slots 6 circumferentially spaced in the periphery of the rotor 3. A stationary housing 7 having an internal diameter larger than the diameter of the rotor 3 and having a central axis eccentric to the axis of the shaft 1 encloses the rotor and vanes. The vanes 5 are urged outward against the inside of the housing 7 by any suitable means, not shown. The pump has an end plate 8 having a relatively long inlet port 9 connected to a suction pipe 11 which in turn is connected to a supply of oil 12 such as a sump. A first fluid discharge port 13 in end plate 8 is connected to a discharge pipe 15 while a second discharge port 17, circumferentially spaced from the first discharge port 13, connects with a discharge pipe 19. The second discharge pipe 19 is connected to a main pressure supply passage 35 and to a pressure regulator valve assembly 21. Regulator valve assembly 21 includes a reciprocable valve 23 having lands $a$, $b$, $c$ and $d$ which control various ports formed in the valve body 24.

The regulator valve 21 acts to maintain a desired pressure in the passage 35 which is connected by a pipe 35A to supply the transmission control elements such as fluid servos, valving, etc., not shown. Fluid carried by the vanes 5 from the inlet port 9 to the first discharge port 13 can pass into the main pressure supply passage 35 only through a check valve 27 urged to a closed position by a spring 29. A relief valve 31 held closed by a spring 33 having a predetermined strength, acts to limit maximum pressure in the pipe 35, and, hence, in the main fluid system.

The fluid under pressure pumped through the first discharge port 13 past check valve 27 into the passage 35 and the fluid pumped through the second discharge port 17 directly into the passage 35 acts through a port 37 in the valve body 24, thence through a passage 39 and restriction 41 in the chamber 43. Pressure in chamber 43 acts on the right hand side of land $c$ to urge the valve member 23 to the left to the position shown in the figure against a regulator spring 45. Movement of the valve 23 to the left allows fluid to pass between lands $b$ and $c$ into a pipe 47 which is connected to a device having relatively low pressure such as a fluid torque converter or fluid coupling 48. The passage 47, and whatever it is connected to, provide a limited capacity relief for the fluid supplied by the pump, this relief being sufficient at low pump speeds to relieve enough pressure in passage 35 and chamber 43 so that the spring 45 can resist further movement of the valve 23 to the left from the position shown in the figure.

If the pump shaft 1 increases in rotational speed so that the volume of fluid discharged through the ports 13 and 17 increases or if an auxiliary pump, such as an output shaft or rear pump used in the transmission and indicated by the box 61 in the figure, adds additional fluid through the pipe 19 to the main line pressure passage 35, the relief passage 47 will not be able to relieve sufficient fluid to prevent the pressure in chamber 43 from increasing and moving the valve 23 further to the left against the spring 45. Movement of the valve 23 further to the left from the position shown in the figure will allow the groove between lands $a$ and $b$ to connect a branch 15a of the first discharge pipe 15 to an extension of the pump suction passage 11. This will lower the pressure in the passage 15 and allow the spring 29 to close the check valve 27. Since the first discharge port 13 is now connected to the zero pressure passage 11 no fluid under pressure will be delivered by the pump through the port 13 and only the second discharge port 17 connected through the pipe 19 will be supplying fluid under pressure to the main fluid system.

With the pump no longer delivering fluid under pressure through the discharge port 13 into the system the relief passage 47 can again exhaust a sufficient volume of fluid from the system to prevent the pressure in the main pressure line 25 and chamber 43 from building up further. If the pump is driven by shaft 1 still faster and/or if the rear pump 61, if used, supplies a still greater volume of fluid into the main pressure passages 35, the valve 23 will be moved by pressure in chamber 43 still further to the left until the groove between lands $b$ and $c$ directly connects the main passage 35 to the pump suction passage 11 which acts as a secondary relief passage.

The pressure regulator valve 21 may be a simple single pressure, a multi-step pressure level control or may have an infinitely variable pressure regulation controlled by some transmission condition. To provide for a two step or two range pressure regulation a pipe 53 is shown connected to a chamber 55 in the valve body 24 and if fluid under pressure from any source is supplied into pipe 53 the pressure therein will act on the end of valve 23 to aid pressure in chamber 43 in moving the valve 23 to the left. This will cause the regulator valve to maintain a lower pressure since a lower pressure in main pressure passage 35 will now produce the same total force acting on the valve 23 to move it to the left against spring 45. If the pressure in pipe 53 is variable, then the pressure maintained in passage 35 by the valve 21 will also vary.

The pressure maintained in the main line pipe 35 can also be varied by supplying a constant or variable pressure into a pipe 57 that connects into a chamber 59 in which the spring 45 is located. Pressure introduced into this chamber 59 aids the spring 45 to move the valve 23 to the right and if this pressure is increased a greater pressure must exist in passage 35 to hold the valve 23 in an equilibrium position where the total forces acting to move the valve member 23 to the right equals that acting to move it to the left.

If there is a sudden increase in the demand of fluid supplied through the pipe 35A such as where a fluid servo with a large capacity is connected to pipe 35, the pressure in the pipe 35 and chamber 43 will drop allowing the spring 45 and any pressure in chamber 59 to move the valve 23 to the right to initially cause land $b$ to cut off relief of pressure from line 35 to the suction passage 11 and thereafter cause land $a$ to cut off communication between the first discharge branch 15$a$ and the pump suction passage 11. Fluid under pressure will then again be supplied through the first discharge port B past check valve 27.

The invention provides for a simple, easily constructed variable capacity pump that has a minimum of ports and yet provides desired results. Other uses and installations will be readily apparent and many modifications can be made without departing from the invention which is limited only by the following claim.

I claim:

A fluid pressure supply, the combination including a pump having an inlet port connected to a source of fluid and a pair of outlet ports, one of said outlet ports connected to a pressure supply conduit and the other of said outlet ports connected to said conduit through a check valve, pressure regulator valve means for controlling the pressure in said conduit by exhausting a variable quantity of fluid from said conduit to relieve excess pressure in the same, said valve means including a valve body having a bore, a valve member reciprocably mounted in said bore, a spring in said bore urging said valve in one direction with a first force, a plurality of valve ports in said body connecting into said bore, a first of said valve ports connected to said other outlet port and a second of said valve ports connected to said conduit, the end of said valve member opposite said spring and one end of said bore forming a chamber, means connecting said conduit to said chamber whereby fluid pressure from said conduit acts on said valve member to urge the same against said spring with a second force, a third valve port in said bore connecting to fluid receiving means having a predetermined maximum flow capacity, a fourth valve port in said bore connected to said pump inlet port, and pressure responsive means adjacent one end of said valve member for urging said valve member in one direction with a third force, said pressure responsive means adapted to be connected to a variable source of pressure whereby said third force will vary in proportion to the pressure from said variable source, said valve member having lands and grooves controlling said valve ports and arranged so that movement of said valve caused by an increase in the value of said second force will initially position the valve to variably connect said second port with said third port to relieve pressure in said conduit to said fluid receiving means, continual movement of said valve member by a further increase of said second force resulting from said pressure relief to said fluid receiving means reaching a limiting maximum value acting to vary the relative positions of said lands and grooves with respect to said bore ports to variably connect said first port with fourth port to relieve pressure from said other pump outlet port to said pump inlet port, a still further increase in said second force further moving said valve member to variably connect said second port to said fourth port to directly relieve pressure from said pressure supply conduit to said pump inlet port, said pressure response means acting to vary the value of said second force required to move said valve member through its various positions.

References Cited in the file of this patent

UNITED STATES PATENTS

| | | |
|---|---|---|
| 2,247,261 | Towler et al. | June 24, 1941 |
| 2,536,486 | Berry | Jan. 2, 1951 |
| 2,568,356 | Moulden | Sept. 18, 1951 |
| 2,665,637 | Lauck | Jan. 12, 1954 |
| 2,691,940 | McFarland | Oct. 19, 1954 |
| 2,696,788 | Funston | Dec. 14, 1954 |
| 2,878,753 | Adams et al. | Mar. 24, 1959 |
| 2,887,060 | Adams et al. | May 19, 1959 |
| 2,905,191 | Vander Kaay | Sept. 22, 1959 |